(12) United States Patent
Lupher et al.

(10) Patent No.: US 9,823,047 B2
(45) Date of Patent: *Nov. 21, 2017

(54) SYSTEM AND METHOD OF CONTROLLING DISCHARGE OF A FIREARM

(71) Applicant: TrackingPoint, Inc., Pflugerville, TX (US)

(72) Inventors: John Hancock Lupher, Austin, TX (US); John Francis McHale, Austin, TX (US)

(73) Assignee: TRACKINGPOINT, INC., Pflugerville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,194

(22) Filed: Aug. 17, 2015

(65) Prior Publication Data

US 2016/0109210 A1  Apr. 21, 2016

Related U.S. Application Data

(63) Continuation of application No. 13/384,338, filed as application No. PCT/US2011/000281 on Feb. 16, 2011, now Pat. No. 9,110,295.

(Continued)

(51) Int. Cl.

| | | |
|---|---|---|
| *F41G 3/00* | (2006.01) | |
| *F41G 1/38* | (2006.01) | |
| *F41A 17/06* | (2006.01) | |
| *F41A 19/10* | (2006.01) | |
| *F41A 19/58* | (2006.01) | |
| *F41A 27/30* | (2006.01) | |

(Continued)

(52) U.S. Cl.
CPC .............. *F41G 3/005* (2013.01); *F41A 17/06* (2013.01); *F41A 19/10* (2013.01); *F41A 19/58* (2013.01); *F41A 27/30* (2013.01); *F41C 27/22* (2013.01); *F41G 1/38* (2013.01); *F41G 3/06* (2013.01); *F41G 3/12* (2013.01); *G02B 23/145* (2013.01)

(58) Field of Classification Search
CPC .......... F41A 17/06; F41A 19/10; F41A 19/58; F41A 27/30; F41C 27/22; F41G 1/38; G02B 23/145
USPC ........... 42/70.06, 70.09, 119, 122, 130, 131; 89/41.03, 41.05, 41.17, 134
See application file for complete search history.

(56) References Cited

U.S. PATENT DOCUMENTS

| | | | |
|---|---|---|---|
| 953,279 A | | 3/1910 | Moore |
| 4,370,914 A | * | 2/1983 | Voles ...................... F41G 3/165 89/41.03 |

(Continued)

FOREIGN PATENT DOCUMENTS

EP  0898144  2/1999

OTHER PUBLICATIONS

European Search Report, PCT/US2011000281, Oct. 27, 2014.
Brochure, Trijicon Combat Optics, CCAS Continuously Computed Aiming Solution, PML 4032 Rev(0), 2013, 5 pages.

*Primary Examiner* — Bret Hayes
(74) *Attorney, Agent, or Firm* — Cesari & Reed, LLP; R. Michael Reed

(57) ABSTRACT

A method includes defining a designation point on a target within a view area of a scope coupled to a firearm and determining an angular motion deviation of a muzzle of the firearm from the designation point. The method further includes initiating firing of the firearm when the angular motion deviation is below an acceptable level.

20 Claims, 6 Drawing Sheets

Related U.S. Application Data

(60) Provisional application No. 61/338,203, filed on Feb. 16, 2010.

(51) Int. Cl.
| | | |
|---|---|---|
| *F41C 27/22* | (2006.01) | |
| *G02B 23/00* | (2006.01) | |
| *F41G 3/06* | (2006.01) | |
| *F41G 3/12* | (2006.01) | |

(56) References Cited

U.S. PATENT DOCUMENTS

| | | | |
|---|---|---|---|
| H538 H * | 11/1988 | Betzold | F41A 17/08 434/22 |
| 4,787,291 A | 11/1988 | Frohock, Jr. | |
| 5,208,418 A * | 5/1993 | Toth | F41G 5/26 89/200 |
| 5,379,676 A * | 1/1995 | Profeta | F41G 5/08 89/41.05 |
| 5,686,690 A * | 11/1997 | Lougheed | F41A 17/08 348/155 |
| 6,237,271 B1 | 5/2001 | Kaminski | |
| 6,499,382 B1 * | 12/2002 | Lougheed | F41G 3/06 89/41.05 |
| 6,823,621 B2 | 11/2004 | Gotfried | |
| 6,843,014 B1 | 1/2005 | Aponte et al. | |
| 6,856,238 B2 | 2/2005 | Wootton | |
| 6,871,439 B1 | 3/2005 | Edwards | |
| 6,886,287 B1 | 5/2005 | Bell et al. | |
| 7,055,276 B2 | 6/2006 | McPherson et al. | |
| 7,089,844 B2 | 8/2006 | Becker | |
| 7,404,268 B1 | 7/2008 | Page | |
| 7,421,816 B2 * | 9/2008 | Conescu | F41G 1/473 42/114 |
| 8,065,807 B2 * | 11/2011 | Rucinski | F41G 1/467 124/87 |
| 8,172,139 B1 | 5/2012 | McDonald et al. | |
| 9,110,295 B2 * | 8/2015 | Lupher | F41A 17/06 |
| 2004/0099134 A1 | 5/2004 | Gotfried | |
| 2005/0268521 A1 | 12/2005 | Cox et al. | |
| 2006/0005447 A1 | 1/2006 | Lenner et al. | |
| 2007/0234626 A1 | 10/2007 | Murdock et al. | |
| 2007/0277421 A1 * | 12/2007 | Perkins | F41G 1/38 42/122 |
| 2008/0039962 A1 | 2/2008 | McRae | |
| 2012/0037702 A1 * | 2/2012 | Kude | F41G 1/38 235/407 |
| 2012/0159833 A1 | 6/2012 | Hakanson et al. | |
| 2012/0314283 A1 | 12/2012 | Jahromi | |

* cited by examiner

SYSTEM AND METHOD OF CONTROLLING DISCHARGE OF A FIREARM

CROSS-REFERENCE TO RELATED APPLICATION(S)

This application is a continuation of and claims priority to co-pending U.S. patent application Ser. No. 13/384,338 entitled "System and Method of Controlling Discharge of a Firearm," which was filed on Aug. 10, 2012, and which was a national stage application of International Patent Application No. PCT/US2011/000281, filed on Feb. 16, 2011 and entitled "Advanced Firearm or Air Gun Scope", which is incorporated herein by reference in its entirety and which application is a non-provisional of and claims priority to U.S. Provisional Application No. 61/338,203, filed Feb. 16, 2010, which is also incorporated herein by reference in its entirety.

FIELD

This description relates to ballistic muzzle tracking and related devices, and especially to telescopic ballistic sights to achieve medium and long-range accuracy in the presence of normal human tremor.

BACKGROUND

Shooting a firearm or air gun device accurately requires that many variables be taken into consideration—human steadiness or lack thereof, angle of shot (uphill or downhill), distance, bullet ballistic information (velocity, sensitivity to wind), and wind speed all affect the accuracy of a given shot. The problem is that there is no way for most shooters to integrate or eliminate all of these variables and make an accurate shot. This is particularly true for shots beyond 200 yards and shots at smaller targets. As a result, shots between 200 yards and 500 yards are rarely completed successfully. A typical shooter will introduce human jitter and trigger jerk somewhere between 2 and 15 minutes of angle (MOA). At 500 yards, a shooter could miss the target by up to 75 inches or more.

The issue of human steadiness is a critical one and has been addressed in the prior art. Most solutions tend to be approaches that involve the active stabilization of the rifle. An example is EP0898144 B1 in which, during a tracking mode, undesired motion is sensed by position sensors and the information is fed to inertial rate sensors make the barrel relatively immune to movement of the stock to facilitate the barrel remaining sighted on the tracked target. U.S. Pat. No. 7,055,278 describes a damper system for reducing vibrations during and after firing, that involves adding damper weights to the firearm. Similarly, PCT application WO8102925 A1 describes a rifle with a stabilizing structure that receives the arm of the user so that forces are exerted upon the stabilizing structure by various surfaces of the shoulder or upper arm of the shooter. These design elements result in resistance to translational movements and rotational movements about any set of three mutually perpendicular axes.

All of these approaches might be termed as active stabilization of the rifle. They may help reduce tremor but can involve specially designed rifles or significantly cumbersome additions to known rifles.

There is a need for a different approach, one that can be applied to a wide variety of firearm or air gun devices, and that does not require cumbersome additions to the firearm or air gun devices. This is achieved in this description by using not active rifle stabilization but attitude tracking coupled with firing synchronization.

SUMMARY

The above identified needs are met by a method for using a firearm or air gun sighting scope for automated compensation of human unsteadiness during firing of firearms or air guns including at least the steps of: aiming the firearm or air gun on a desired target and initiating action to create a designation point and activate muzzle tracking; initiating firing of the firearm or air gun device, which fires only when the angular motion deviation of the firearm or air gun muzzle from the angular position designation point are below an acceptable level.

In another aspect of the method the designation point remains fixed in the field of view.

In another aspect of the method, a trigger pull is resisted or inflated while the angular motion deviations of the firearm or air gun muzzle from the angular position designation point are above an acceptable level.

The above identified needs are also met by a firearm or air gun sighting scope system for automatic compensation of human unsteadiness during firing of firearms or air guns using an angular position designation point including at least: a muzzle tracking module wherein said muzzle tracking module tracks angular motion deviations of the firearm or air gun muzzle from the angular position designation point; a synchronized trigger mechanism that enables firing of the firearm or air gun when the angular motion deviations of the firearm or air gun muzzle from the angular position designation point is below an acceptable level and prevents or impedes firing when the angular motion deviation of the firearm or air gun muzzle from the angular position designation point is above the acceptable level.

In another aspect the muzzle-tracking module of the firearm or air gun sighting scope system includes at least an image sensor, an inclinometer; and gyroscopes.

In another aspect the synchronized trigger mechanism of the firearm or air gun sighting scope system includes at least a solenoid to prevent firing when angular deviation of the muzzle from the angular position designation point is above an acceptable level.

In another aspect the synchronized trigger mechanism of the firearm or air gun sighting scope system includes at least a nitinol wire variable force trigger to prevent firing when angular deviation of the muzzle from the angular position designation point is above the acceptable level.

In another aspect the synchronized trigger mechanism of the firearm or air gun sighting scope system includes at least a safety switch to prevent firing when angular deviation of the muzzle from the angular position designation point is above an acceptable level; an electrically activated primer; a bolt with an internal electrical contact for electrical connection to the electrically activated primer; and an electronic activation circuit for activation of the electrically activated primer.

In another aspect the firearm or air gun sighting scope system for automatic compensation of human unsteadiness during firing of firearm or air gun devices also includes at least an automatic ballistics cross-hair that is computationally generated and automatically re-positioned in the field of view based on target range, bullet ballistics, wind, and muzzle incline/decline.

BRIEF DESCRIPTION OF THE DRAWINGS

In order that the invention can be more clearly ascertained examples of preferred embodiments will now be described with reference to the accompanying drawings wherein.

DETAILED DESCRIPTION OF ILLUSTRATIVE EMBODIMENTS

Figure 1:
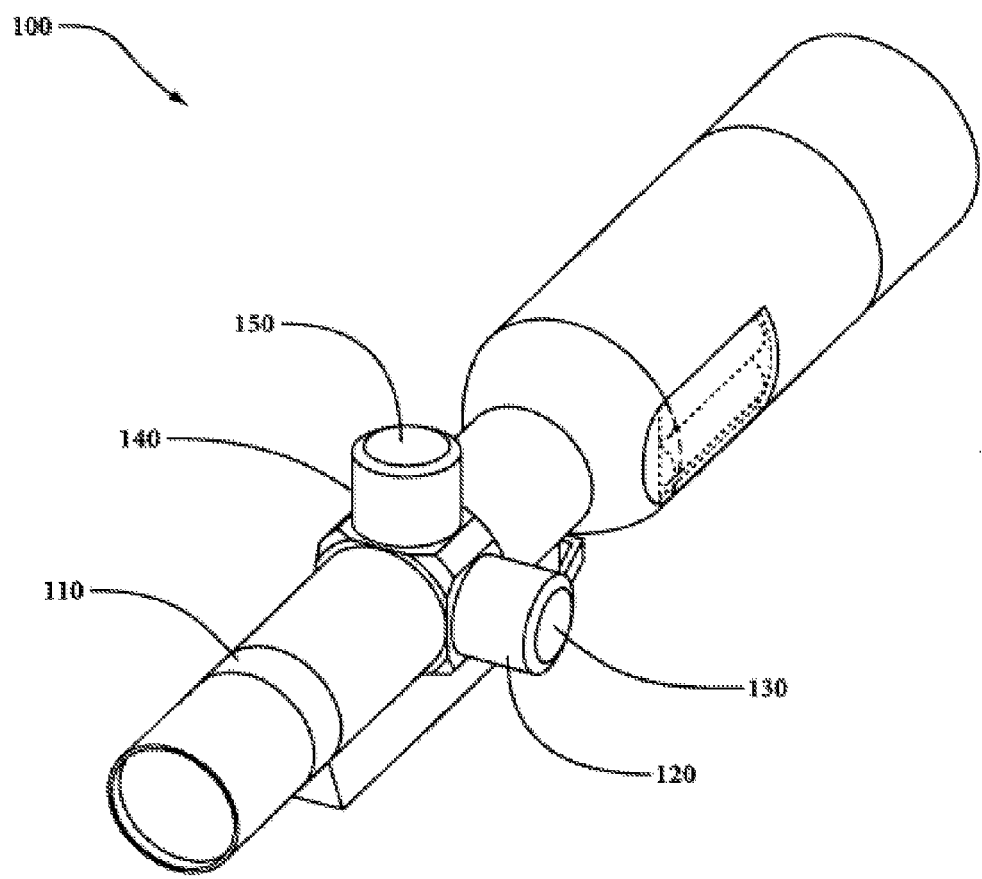
FIG. 1 is a rendering of an embodiment of the firearm or air gun sighting scope.

FIG. 1 is an illustration of an embodiment of the firearm or air gun sighting scope 100. It appears very similar to other scopes but has very different functionality. An elevation knob 140 has an electronic button 150. A windage knob 120 also has an electronic button 130. As in other scopes an optical zoom adjustment is shown as 110.

Figure 2:
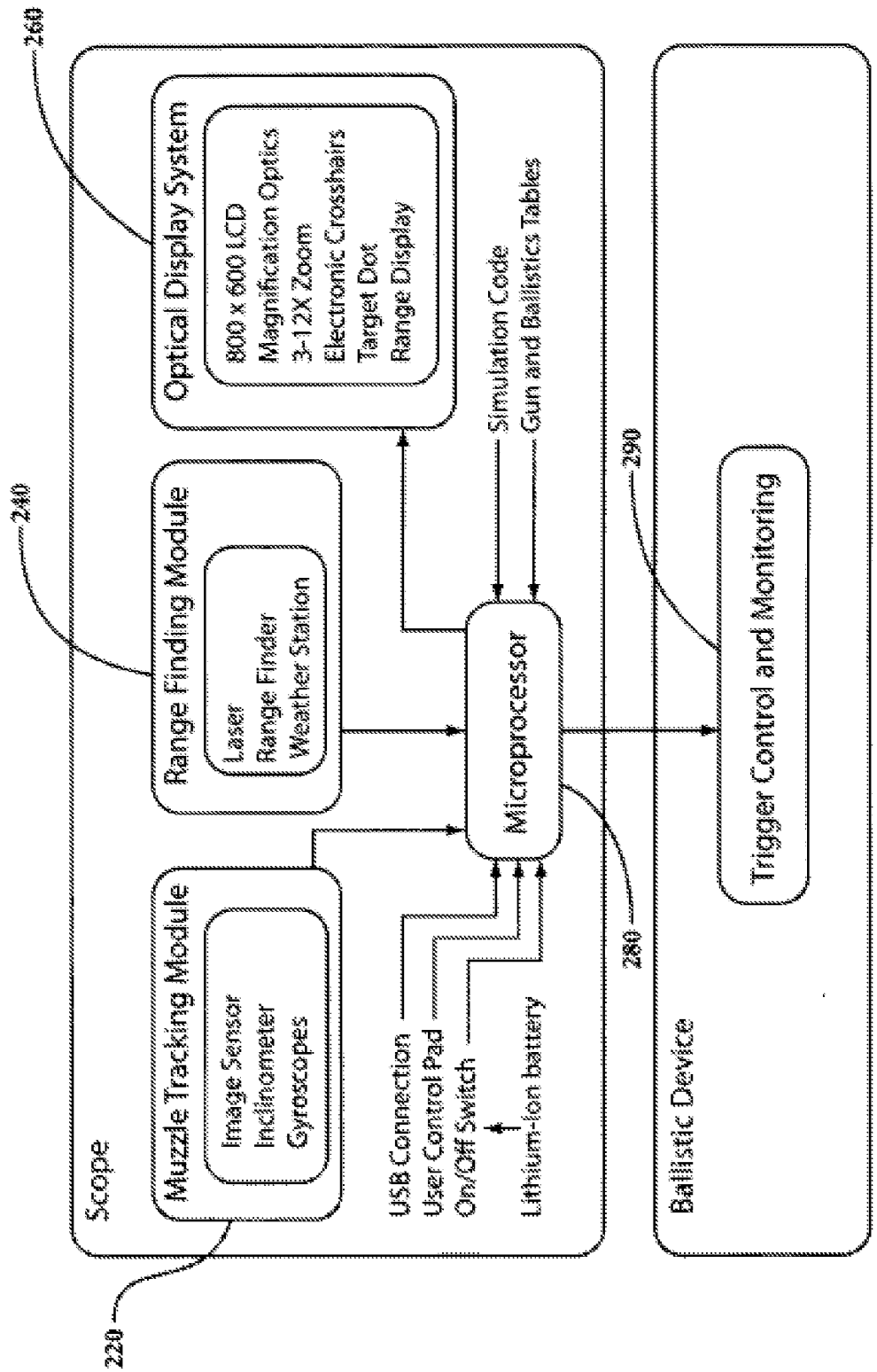
FIG. 2 is a schematic of functional subsystems of the firearm or air gun sighting scope system.

The complete firearm or air gun sighting scope system can be broken into two parts: a scope and a ballistic device. FIG. 2 is a schematic representation of the subsystems with the two major parts shown as the advanced intelligent firearm or air gun scope (Scope) in the top half of the representation that provides all of the functionality of attitude tracking, and the Trigger Monitoring and Control (TMC), represented in the bottom half (Ballistic Device) that provides firing synchronization.

The proposed scope has three major components—a muzzle-tracking module (MTM) 220, a range finding module 240 and an optical display system 260. The muzzle-tracking module contains an array of gyroscopes and an image sensor for muzzle position tracking and an inclinometer to determine shot angle relative to gravity. All of these feed into a core microprocessor 280 with embedded software that provides the intelligence for the system. All of the microprocessor capability can be supplied with one central microprocessor as shown or that capability could be split between the various modules.

Figure 3:
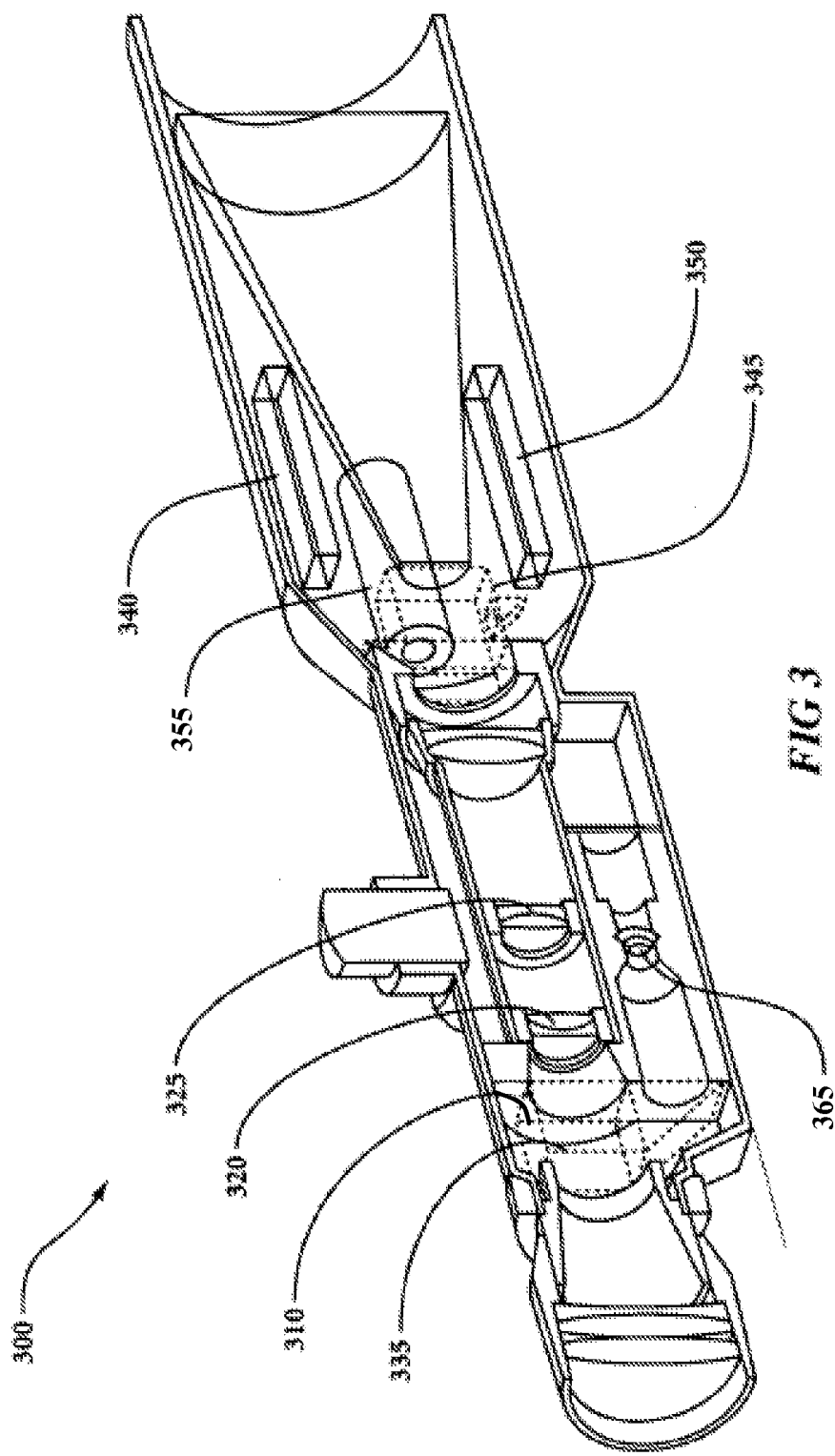
FIG. 3 is a cutaway view of an embodiment of the firearm or air gun sighting scope.

FIG. 3 is a rendering of the internals of the firearm or air gun sighting scope 300. Range finding module 240 uses a "time of flight" laser range finding approach. An off axis infrared laser 350 generates light that is reflected using beam splitters 345 into the scope optical path toward the target. Laser light is emitted in timed pulses that illuminate the target. The returning reflection from the target is detected by an avalanche photodiode receiver 340 and the time delay is measured to with 1 nanosecond. This time of flight is used to determine the distance to the target.

The scope also contains an optical display system 260. It is built around a zoom power scope with zoom lenses 320, 325 that typically give a 3×-12× power range but is not limited to that. The sighting scope also includes a display beam splitter 335, and an image sensor 310. Power is supplied by an internal battery 355. The invention anticipates that the scope can be a video (camera) scope or a natural light scope. The optical system projects the reticle, range and configuration screens onto a display 365 in the field of view. One aspect of the optical display system is the capability of the shooter to initially position the horizontal and vertical reticles (crosshair) on a potential target and press the shot control button 130 on the windage knob 120 (see FIG. 1) to illuminate a colored dot or designation-dot that represents the desired designation point on the target. This is used in shot simulation, muzzle tracking, and trigger synchronization to be described later.

Trigger control and monitoring 290 is separate from the scope, as shown in FIG. 2. The proposed scope can mount on any firearm or air gun device, including various rifles and bows. However, to utilize the scope shot stabilization capability the firearm or air gun device must be specially modified with Trigger Monitor and Control (TMC) capability.

Figure 4:
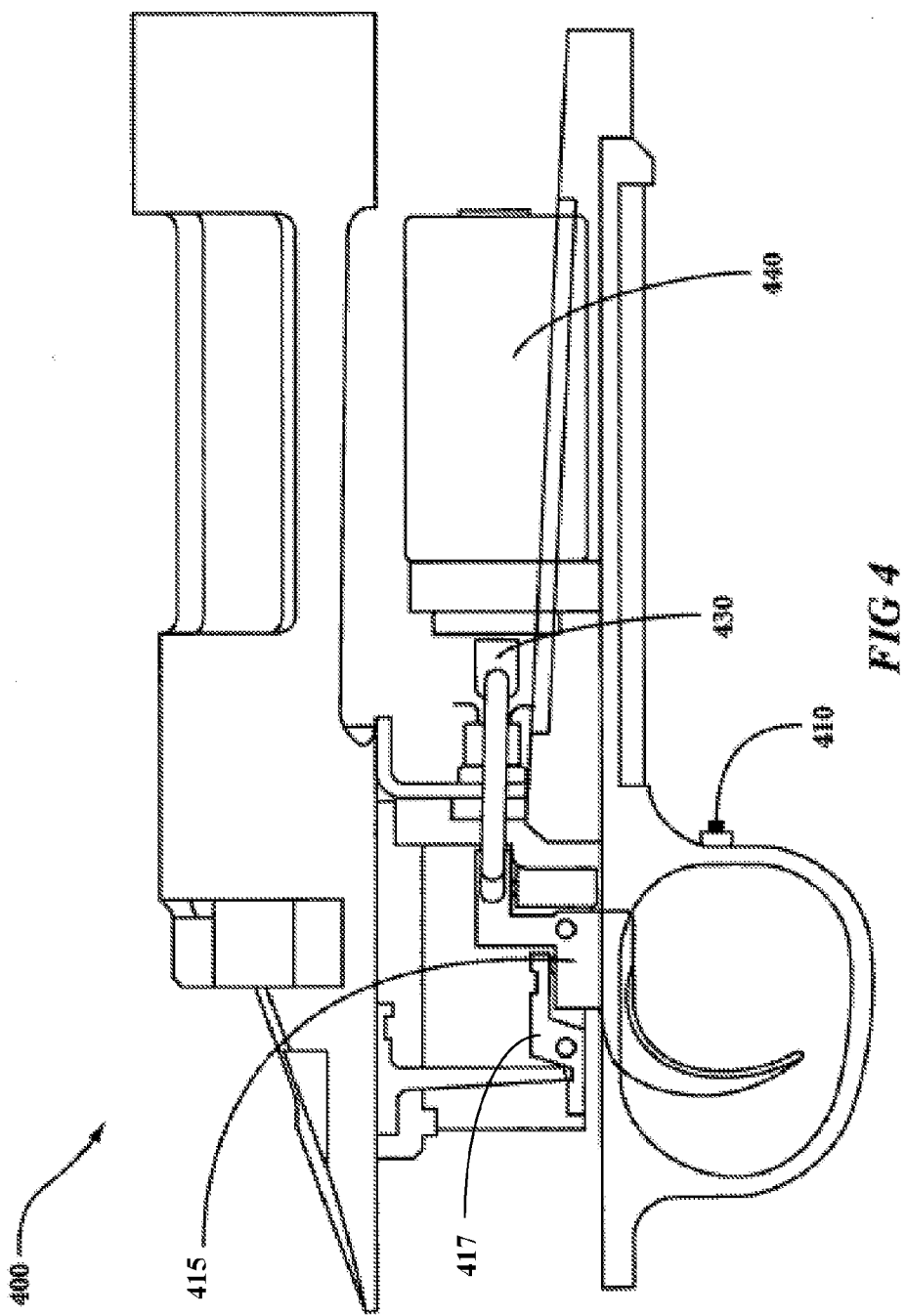
FIG. 4 is a rendering of a trigger control embodiment.

One embodiment of the TMC capability in shown in FIG. 4 as system 400 which includes 1) a solenoid 440 with proximity switch 430 that functions to restrict firing when off target, and 2) internal wiring and connector to connect the solenoid to the scope. The TMC includes a two state trigger 415 and shot control switch 410. The mechanism increases the trigger pull force when the solenoid is activated from normal trigger pull force of approximately 2 lbs to a restricting force of about 8 lbs. If the shooter applies more than 8 lbs of force to the trigger, he may fire in spite of the solenoid's restricting force.

Figure 5:
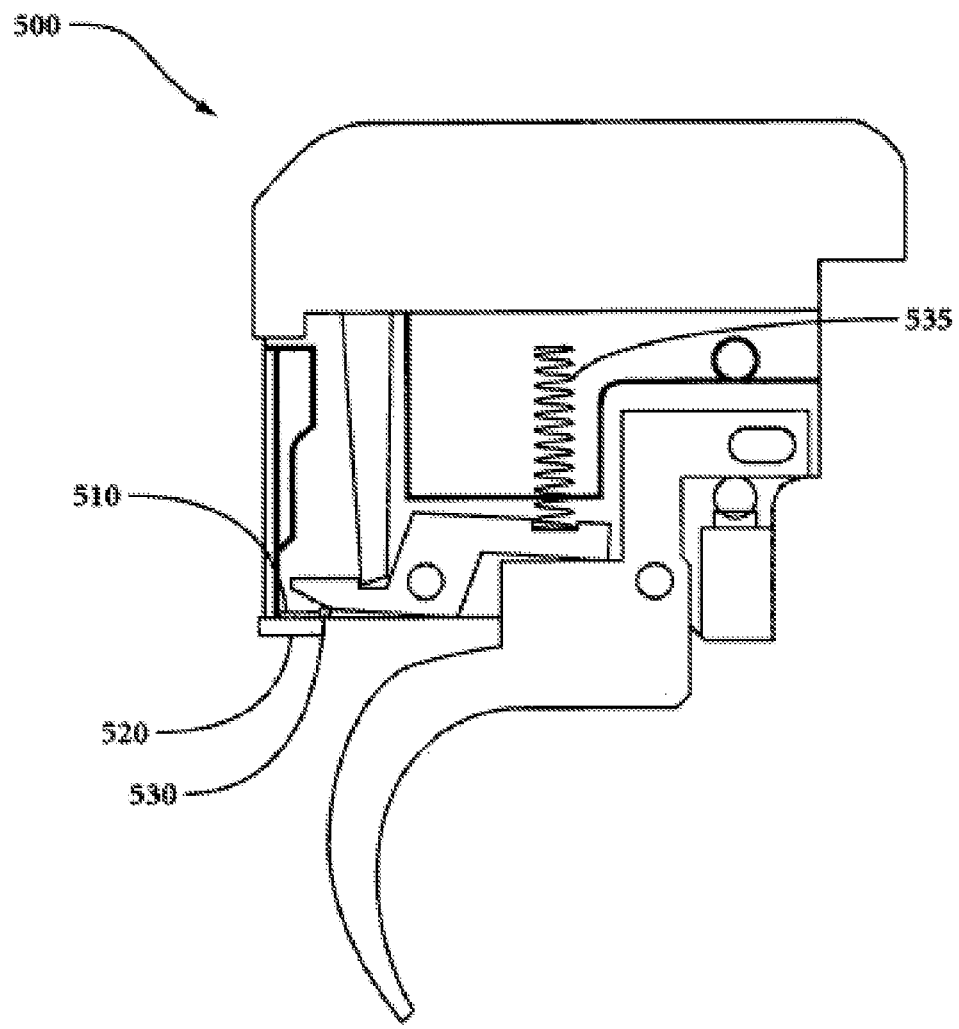
FIG. 5 is a rendering of another trigger control embodiment.

A second embodiment of the TMC capability, shown in FIG. 5 as system 500 is a nitinol wire variable force trigger, which consists of 1) a nitinol wire retractor 510, 2) a wedge pin 530, 3) a cantilever spring 520, and 4) a trigger spring 535. This mechanism increases the trigger pull force when the wedge pin is moved between the cantilever spring and trigger sear. When the wedge pin is in place, the trigger pull force of approximately 2 lbs inflates to a restricting force of about 8 lbs. If the shooter applies more than 8 lbs of force to the trigger, he may fire in spite of the spring's restricting force.

A third embodiment of the TMC consists of an electric trigger system consisting of a safety switch, a 2 lbs switch 417 and an 8 lbs switch 430 on the trigger 415, an electrically activated primer for discharging the firearm, a bolt with an internal electrical contact for electrical connection to the primer and an electronic activation circuit for activation of the primer. This circuit performs the same functions typical of a trigger design, including monitoring the safety switch and trigger switches. A trigger pull of 8 lbs or more will fire the gun, and a trigger pull of 2 lbs or more but less than 8 lbs will fire the gun only if the gun is aligned with the designation point.

The scope has three primary capabilities: a direction designation method such as a Shot Simulator, a muzzle tracking method such as the Muzzle Tracking Module to measure angular motion deviations from the designated direction, and a synchronized firing method such as the Trigger Monitor and Control mechanism. Each is described below.

Shot Simulator—

The proposed scope allows the shooter to quickly and automatically simulate a shot before firing. When the shooter aligns the reticle on a desired target and presses the shot control button on the windage knob, a colored dot (designation-dot) appears in the field-of-view where the horizontal and vertical reticles cross (cross-hair). This designation dot or designation point represents the muzzle position at designation time and simulates the point of impact should the shooter pull the trigger. If the shooter is satisfied with the impact point as marked by the designation-dot, he pulls the trigger while endeavoring to keep the cross-hair on the designation-dot.

If the shooter is not satisfied with the designated impact point, he attempts to realign the cross hair with his intended impact point, and presses the shot control button again, at which time the designation-dot reappears. The shooter can repeat the simulation multiple times until he is satisfied with the impact point indicated by the designation-dot.

Muzzle Tracking—

As natural shooter jitter occurs, the cross-hair will move off the simulated point of impact but the designation-dot or designation point will stay fixed with the field of view. This is done by continually monitoring and processing the field-of-view image. Movement in the image represents the rate and direction of muzzle movement. The muzzle-tracking module continuously tracks angular motion deviations of the muzzle from the angular position designation point. Using kinematic equations, the microprocessor can then predict when the muzzle will re-intersect the designation point. These kinematic equations take into account angle and direction of muzzle movement and the time it takes for the firing-pin to strike and launch the bullet.

Shot Synchronizer—

If the Shot Synchronizer is in use, the trigger pull will be resisted or inflated while the angular motion deviations of the muzzle from the angular position designation point are above an acceptable level, but the trigger resistance will relax or deflate when the cross-hairs approach the designation-dot and the deviation of the muzzle from the angular position designation point are below an acceptable level. This enables firing of the firearm or air gun when the angular motion deviation of the firearm or air gun muzzle from the angular position designation point is at an acceptable level and prevents or impedes firing when the angular motion deviation of the firearm or air gun muzzle from the angular position designation point is above the acceptable level. If the Shot Synchronizer is not in use, the trigger will release when the normal trigger pull-force has been exceeded.

A typical shooter will introduce human jitter and trigger jerk somewhere between 2 and 15 minutes of angle (MOA). At 500 yards a shooter could miss the target by up to 75 inches or more. The Shot Synchronizer limits the impact of human jitter and trigger jerk to 0.8 MOA which is about 4 inches at 500 yards. This type of accuracy is attainable even if the shooter is firing "off-hand" without a gun rest. The Shot Synchronizer works in conjunction with the Shot Simulator. When the Shot Synchronizer is in use, an actuator in the trigger inflates the trigger pull force (to approximately 8 lbs.) to restrict firing. When the cross-hair intersects the designation-dot the actuator releases and normal trigger pressure (2 to 3) pounds is overridden by the shooter and the shot is fired.

In addition to these primary functions the proposed scope has the following additional embodiments:

Built-in Range-Finder—

The firearm or air guns scope has an embedded laser range finder. A laser diode generates a beam of light that is projected out through the scope through a beam splitter. The range finder can operate to 800 yards with an accuracy of +/−1.5 yard. The range finder can be activated in two ways. With rifles that include the trigger control and monitoring system 290, the range finder can be activated by pressing the shot control button. For non-trigger control and monitoring system firearm or air gun devices, the range finder is activated by one of the buttons on the firearm or air guns scope. The range finder also has a weather station that records wind speed, humidity, and air pressure.

Automatic Ballistics Crosshair—

Prior to shot simulation, the reticle on the firearm or air guns scope is electronically positioned in the field-of-view of the scope. After ranging the shot the positions of the horizontal and vertical axis of the reticle are automatically repositioned in the field-of-view based on target range, bullet ballistics, wind and muzzle incline/decline. The new cross-hair, based on the repositioned reticles, becomes the shooters target alignment point. The reticle is typically not displayed when the gun is not in use. When the gun is moved to roughly a horizontal position the reticle appears.

User Control Interface—

The proposed scope includes a plurality of buttons and selection knobs (FIG. 1) that allow the user to configure, manage, and operate the scope. These buttons and knobs are the interface for the user. Some of the variables that can be input through these controls are at least: Power On/Off, shot control button, wind direction and speed, gun type, ammunition type, reticle type, and configuration of other user preferences.

The windage knob and button on the User Control Interface allow the selection of Configuration Mode. This mode displays a menu which is scrolled by twisting the windage knob and selected by pressing the windage knob's button. Two additional features are selectable from this menu:— Single-Shot Automatic Alignment Mode and Ammo Select.

Single-Shot Automatic Alignment—

The proposed scope's automatic alignment capability is a significant innovation. Without this capability, a typical shooter may take a dozen or more shots and up to an hour's time aligning the scope with the muzzle. This manual process is often unreliable because of shooter jitter and trigger jerk. The proposed scope eliminates the need for mechanical alignment turrets, eliminates the need to know the range of the alignment target and eliminates error due to jitter and jerk. When in auto alignment mode, the shooter aligns the cross hair on the center of the target and presses the shot control button. If the designation-dot is on the center of the target, the shooter completes the shot by increasing trigger pressure. The shooter then lines up on the target center, presses the shot control button, moves the cross-hairs to where the round impacted the target and again presses the shot control button. The cross hairs then adjust automatically completing alignment.

Update Mode—

In this mode the proposed scope is connected to a laptop via a universal serial bus (USB) cable. In Update Mode, the scope can download new software, new ammunition information, and new rifle types.

The proposed scope can operate in Standard mode or Advanced mode. Selection of the mode is made by a switch on the side of the scope. In Standard mode, the reticles are displayed in a default location and only updated from that location if the elevation or windage knobs are moved. This mode emulates the features and actions typically found in a traditional riflescope and therefore does not synchronize the trigger or affect it in any way. In Advanced mode, all the advanced features of the scope are enabled including the Shot Simulator, Muzzle Tracking, Shot Synchronization, Automatic Ballistics Crosshair, and the other advanced features.

Figure 6:
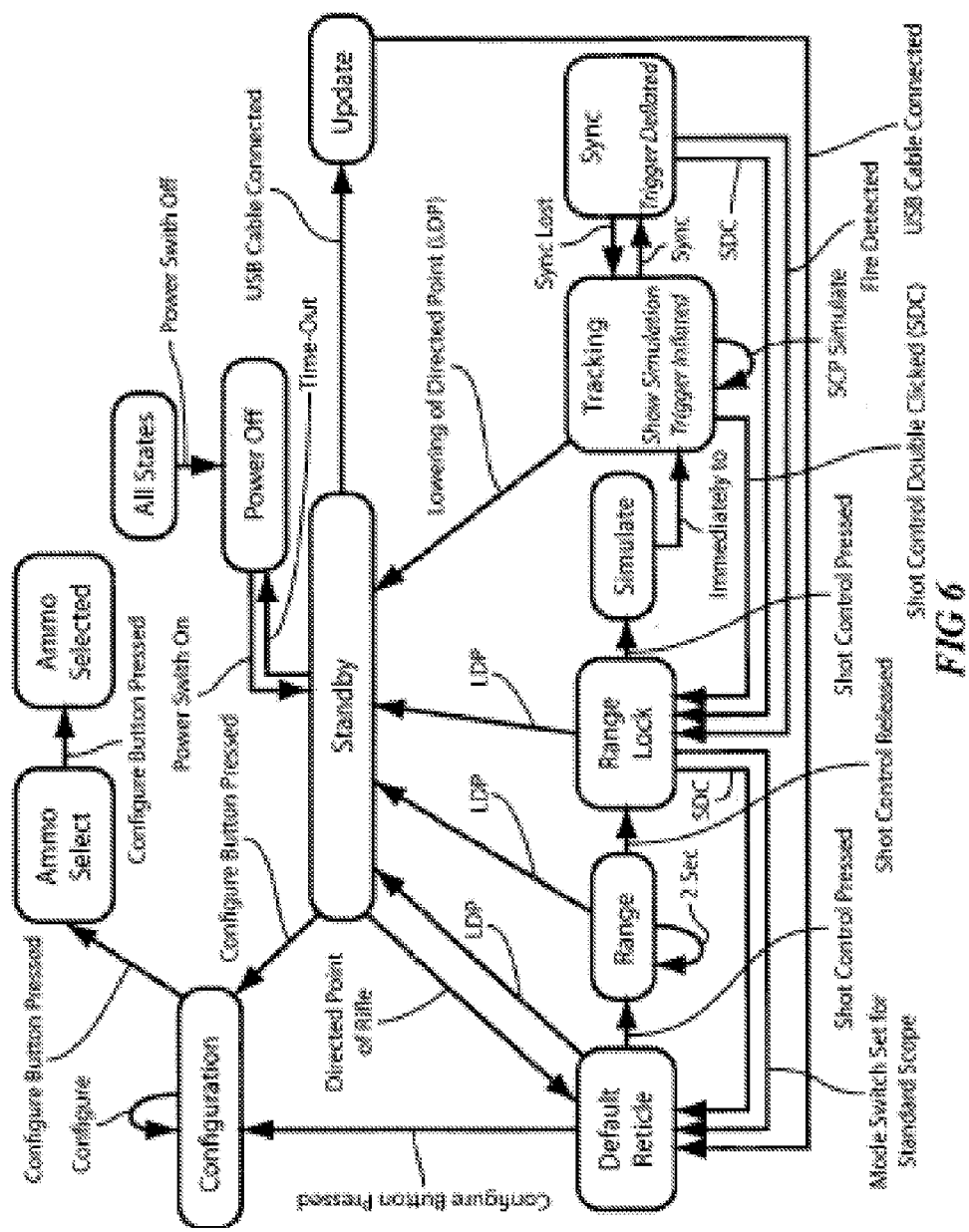
FIG. 6 is a schematic of the states of the system.

Operation in Advanced mode can be understood by reference to FIG. 6, beginning in the Power Off mode. The power up to Advanced mode is indicated by the Power Up command or PU, which is a power switch on the side of the scope. This puts the scope in standby mode. Each primary capability is then activated either through a "Directed Point," or a press of the shot control button:

Directed Point—

When the user points the rifle at a target (DP) the proposed scope detects when the gun is in a steady shooting position by monitoring the inclinometer and gyroscopes. When a Directed Point is detected, the scope automatically powers up and displays the default reticle.

Reset Action—

A double press of the Shot Control Sutton will generally abort the current action and reset the scope back to showing its default reticle.

Step 1—Ranging—

The ballistics scope built-in range finder can range targets up to 800 yards away. In hunting, once the animal is identified, the shooter will find the animal in the scope. He/she will place the cross hair on the animal and press (SCP) the shot control button. The range finder will automatically find the range. The user releases (SCR) the shot control and the range is locked in. The range is displayed in the scope field of view and the range information is used by the scope to set the ballistics reticles. If the shooter ranged on the wrong target or wants to re-start the shooting process for any reason he does a rapid double press. This rapid double press is called the "Reset Action" (SOC). The scope also reverts to the pre-shot state when the rifle is roughly vertical as detected by the inclinometer and gyroscopes.

Step 2—Taking a Simulated Shot—

The shooter moves the ballistics-adjusted crosshair to the desired designation point on the target and presses (SCP) the shot control button. A colored "designation-dot" appears in the field of view. This dot can be any color but is most likely to be set by the user for red or green. This dot is a simulation of where the bullet will impact the target. If the shooter is not satisfied with the simulated shot location he attempts once again to place the colored designation-dot on the target's desired target zone and presses the shot control button again, simulating another shot. The shooter can repeat (SCP) Step 2 multiple times if necessary. Once simulated, muzzle tracking is active and the trigger pressure is inflated. At any time, the shooter can re-start the shot by executing the Reset Action (SOC).

Step 3—Synchronized Firing—

Satisfied with the location of the impact point represented by the designation-dot, the shooter increases trigger pressure to the normal trigger pressure of the rifle (2 to 3 pounds) but the inflated trigger pressure does not allow a shot. As normal shooter jitter occurs, the cross-hair may move off the impact point, but the designation-dot will appear to remain stable on the impact point (as long as the field of view is stationary). The scope will track muzzle movement and will restrict the rifle from firing until the crosshair is realigned with the dot at which time the trigger solenoid is released and the bullet is fired. At any time the shooter can re-start the shot by executing the Reset Action (SOC). Once the rifle fires (Fire Detected) the system returns to Range Lock to for another possible shot.

FIG. 6 also exhibits the other possible system states of configuration, update, and ammo select.

All of the methods disclosed and claimed herein can be executed without undue experimentation in light of the present disclosure. While the methods of this disclosure may have been described in terms of preferred embodiments, it will be apparent to those of ordinary skill in the art that variations may be applied to the methods and in the steps or in the sequence of steps of the method described herein without departing from the concept, spirit and scope of the disclosure. All such similar substitutes and modifications' apparent to those skilled in the art are deemed to be within the spirit, scope, and concept of the disclosure.

What is claimed is:

1. An apparatus comprising:
   a ballistic device including a muzzle and including a trigger mechanism and a trigger monitor and control (TMC) circuit coupled to the trigger mechanism; and
   an optical sighting scope coupled to the TMC circuit and mounted to the ballistic device, the optical sighting scope including a display and including a muzzle-tracking module including:
      a gyroscope;
      an image sensor;
      an inclinometer; and
      a microprocessor coupled to the display, the gyroscope, the image sensor, and the inclinometer, the microprocessor configured to track a muzzle position of the muzzle and to provide a reticle within a field of view provided to the display in response to determining from the inclinometer that an orientation of the ballistic device is substantially horizontal; and
      wherein the TMC circuit is configured to resist a pull of the trigger mechanism by a second force when the microprocessor determines an aim point of the ballistic device deviates from a designation dot by more than a threshold and by a first force that is less than the second force when the aim point of the ballistic device deviates from the designation dot is less than or equal to the threshold.

2. The apparatus of claim 1, further comprising:
   a shot control button coupled to the microprocessor; and
   wherein, in response to a selection of the shot control button, the microprocessor is configured to apply a designation dot at a center of the reticle to select a target within the field of view; and
   wherein the designation dot remains fixed on the target within the field of view.

3. The apparatus of claim 2, further comprising a laser range finder circuit coupled to the microprocessor and configured to determine a range to the selected target in response to the selection of the shot control button.

4. The apparatus of claim of 3, wherein after determining the range, the microprocessor determines bullet ballistics and muzzle incline/decline and automatically repositions the reticle in the field-of-view based on the range, the bullet ballistics, and the muzzle incline/decline.

5. The apparatus of claim 4, wherein the microprocessor tracks an aim point of the muzzle relative to the selected target and communicates with the TMC circuit to restrict firing when a deviation of the aim point from the designation dot is greater than a threshold.

6. The apparatus of claim 5, wherein the TMC circuit comprises a solenoid including a proximity switch configured to increase a trigger pull force from the first force to the second force when the deviation of the aim point from the designation dot is greater than the threshold.

7. The apparatus of claim 5, wherein the TMC circuit comprises:
   a nitinol wire retractor;
   a wedge pin;
   a cantilever spring; and
   a trigger spring;
   wherein the TMC circuit is configured to increase a trigger pull force from the first force to the second force when the deviation of the aim point from the designation dot is greater than the threshold.

8. The apparatus of claim 5, wherein the TMC circuit comprises:
an electric trigger system; and
wherein the trigger mechanism of the ballistic device comprises:
a trigger;
a first switch on the trigger configured to apply the first force;
a second switch on the trigger configured to apply the second force that is greater than the first force; and
wherein the TMC circuit is configured to initiate discharge of the ballistic device in response to a trigger pull greater than the second force or in response to a trigger pull less than the second force and greater than the first force when the deviation of the aim point from the designation dot is less than the threshold.

9. The apparatus of claim 2, wherein, after application of the designation dot on the target, the microprocessor is configured to:
communicate a control signal to the trigger mechanism to discharge the firearm when the reticle is aligned to the designation dot and a trigger pull is detected;
receive a second selection of the shot control button when the reticle is aligned to the center of the target;
receive a third selection of the shot control button when the reticle is aligned to a ballistic impact location; and
automatically adjust the reticle according to the ballistic impact location.

10. An apparatus comprising:
a ballistic device including a muzzle and including a trigger mechanism and a trigger monitor and control (TMC) circuit coupled to the trigger mechanism, the TMC circuit configured to resist a trigger pull with a selected one of a first trigger pull force and a second trigger pull force that is greater than the first trigger pull force; and
an optical sighting scope coupled to the TMC circuit and mounted to the ballistic device, the optical sighting scope including a microprocessor and a muzzle-tracking module, the microprocessor configured to track a deviation of a muzzle position of the muzzle relative to a designated dot on a selected target and to selectively control the TMC circuit to apply:
the first trigger pull force when the deviation is less than a threshold; and
the second trigger pull force when the deviation is greater than the threshold.

11. The apparatus of claim 10, wherein the first trigger pull force is approximately two pounds and the second trigger pull force is approximately eight pounds.

12. The apparatus of claim 10, wherein:
the optical sighting scope further comprises a display; and
the muzzle-tracking module further comprises:
a gyroscope;
an image sensor configured to capture image data of a field of view;
an inclinometer; and
the microprocessor coupled to the display, the gyroscope, the image sensor, and the inclinometer, the microprocessor configured to track a muzzle position of the muzzle and to provide a reticle within at least a portion of the image data of the field of view provided to the display when an orientation of the ballistic device is substantially horizontal.

13. The apparatus of claim 10, further comprising:
a shot control button coupled to the microprocessor; and
wherein, in response to a selection of the shot control button, the microprocessor is configured to apply the designation dot at a center of the reticle to select the target within the field of view; and
wherein the designation dot remains fixed on the target within the field of view.

14. The apparatus of claim 13, further comprising a laser range finder circuit coupled to the microprocessor and configured to determine a range to the selected target in response to the selection of the shot control button.

15. The apparatus of claim of 14, wherein after determining the range, the microprocessor determines bullet ballistics and muzzle incline/decline and automatically repositions the reticle in the field-of-view based on the range, the bullet ballistics, and the muzzle incline/decline.

16. The apparatus of claim 13, wherein, after application of the designation dot on the target, the microprocessor is configured to:
communicate a control signal to the trigger mechanism to discharge the firearm when the reticle is aligned to the designation dot and a trigger pull is detected;
receive a second selection of the shot control button when the reticle is aligned to the center of the target;
receive a third selection of the shot control button when the reticle is aligned to a ballistic impact location; and
automatically adjust the reticle according to the ballistic impact location.

17. A method comprising:
capturing, using an image sensor of an optical sighting scope coupled to a ballistic device, optical data of a view area of the optical sighting scope;
tracking an aim point of a muzzle of the ballistic device using a muzzle-tracking module of the optical sighting scope;
determining a deviation of the aim point from a designation dot on a target within the view area using a microprocessor of the optical sighting scope; and
selectively communicating a signal from the optical sighting scope to a trigger assembly of the ballistic device to selectively adjust a resistance to a trigger pull based on the deviation;
detecting an incline of the ballistic device using at least one of an inclinometer and a gyroscope of the optical sighting scope;
applying a reticle to the view area within a display of the optical sighting scope when the incline is approximately horizontal; and
removing the reticle when the incline is approximately vertical.

18. The method of claim 17, wherein selectively communicating the signal comprises:
communicating the signal to apply a first trigger pull force when the deviation is less than a threshold; and
communicating the signal to apply a second trigger pull force when the deviation is greater than the threshold;
wherein the second trigger pull force is greater than the first trigger pull force.

19. The method of claim 17, further comprising:
receiving, at the microprocessor, a target selection corresponding to a press of a shot control button; and
applying, using the microprocessor, the designation dot to an object within the view area corresponding to a center of a reticle in response to the target selection.

20. The method of claim 19, further comprising determining a range to the object in response to receiving the target selection using a range finder circuit of the optical sighting scope.

* * * * *